US012647891B2

(12) United States Patent
    Barbu et al.

(10) Patent No.:    US 12,647,891 B2
(45) Date of Patent:        Jun. 2, 2026

(54) ACTIVATION OF A WIRELESS TRANSCEIVER USING WAKEUP SIGNALS

(71) Applicant: Nokia Technologies Oy, Espoo (FI)

(72) Inventors: Oana-Elena Barbu, Aalborg (DK);
              Benny Vejlgaard, Gistrup (DK)

(73) Assignee: Nokia Technologies Oy, Espoo (FI)

( * ) Notice:    Subject to any disclaimer, the term of this
               patent is extended or adjusted under 35
               U.S.C. 154(b) by 439 days.

(21) Appl. No.: 18/200,788

(22) Filed:    May 23, 2023

(65)            Prior Publication Data

US 2023/0388929 A1      Nov. 30, 2023

(30)        Foreign Application Priority Data

May 26, 2022    (EP) ..................................... 22175643

(51) Int. Cl.
    *H04W 52/02*        (2009.01)
    *H04W 76/20*        (2018.01)
(52) U.S. Cl.
    CPC ....... *H04W 52/0235* (2013.01); *H04W 76/20*
                                        (2018.02)
(58) Field of Classification Search
    CPC ............. H04W 52/0235; H04W 76/20; H04W
            52/0229; H04W 52/028; H04W 52/0216;
                                        Y02D 30/70
    See application file for complete search history.

(56)            References Cited

U.S. PATENT DOCUMENTS

2006/0176837 A1    8/2006  Son et al.
    2014/0254445 A1    9/2014  Heinzelman et al.

2019/0253972 A1 *  8/2019   Park ................... H04W 52/0235
    2020/0021472 A1    1/2020   Park et al.
    2020/0029302 A1    1/2020   Cox et al.
    2020/0267648 A1    8/2020   Kim et al.
    2021/0368440 A1 * 11/2021   Landis .................. H04W 72/23
    2022/0030518 A1    1/2022   Sjoland et al.
    2022/0046648 A1    2/2022   Kiilerich Pratas et al.
    2022/0070775 A1 *  3/2022   Elkotby ............ H04W 52/0229
    2023/0337135 A1 * 10/2023   Hosseinian ....... H04W 52/0235

FOREIGN PATENT DOCUMENTS

EP            3 927 023 A1    12/2021
    WO      WO 2020/131907 A1     6/2020
    WO      WO 2022/013717 A2     1/2022

OTHER PUBLICATIONS

EESR (22175643.0) Nov. 8. 2022, 9 pgs.
ZTE, RP-213389 "Discussion on Rel-18 low-power WUS", 3GPP
TSG RAN Meeting #94-e, Electronic Meeting, Dec. 6-17, 2021,
https://www.3gpp.org/ftp/TSG_RAN/TSG_RAN/TSGR_94e/Docs/
RP-213637.zip.

(Continued)

*Primary Examiner* — Sun Jong Kim

(74) *Attorney, Agent, or Firm* — Lippes Mathias LLP

(57)            ABSTRACT

An apparatus and method are provided to trigger activation
of a transceiver on a wireless communication apparatus that
uses different forms of wakeup signals and corresponding
forms of wakeup signal detectors. The transceiver operates
in a discontinuous receiving mode, with the different
wakeup signal receivers detecting for wakeup signals at
different times, the times being indicated to the apparatus by
a wakeup signal pattern sent by the network.

18 Claims, 3 Drawing Sheets

(56)                    References Cited

OTHER PUBLICATIONS

Ba et al. "Passive wake-up radios: From devices to applications", Ad Hoc Networks, V11, Issue 8, Nov. 2013, 2605-2621, https://doi.org/10.1016/i.adhoc.2013.08.004 (8 pgs).

Bello et al. "Advances and Opportunities in Passive Wake-Up Radios with Wireless Energy Harvesting for the Internet of Things Applications", Sensors 2019, 19, 3078; www.mdpi.com/journal/sensors doi:10.3390/s19143078 (33 pgs).

Pérez-Penichet et al. "Augmenting loT Networks with Backscatter-Enabled Passive Sensor Tags" HotWireless'16, Oct. 3-7, 2016, New York City, NY, USA DOI: http://dx.doi.org/10.1145/2980115.2980132 (5 pgs).

Zaraket et al. "An overview on low energy wake-up radio technology: Active and passive circuits associated with MAC and routing protocols", Journal of Network and Computer Applications (2021), doi: https://doi.org/10.1016/j.jnca.2021.103140 Jan. 2021 (31 pgs).

Chen, et al. "Range Extension of Passive Wake-up Radio Systems Through Energy Harvesting", IEEE Internaional Conference on Communications (ICC), Jun. 9-13, 2013.

* cited by examiner

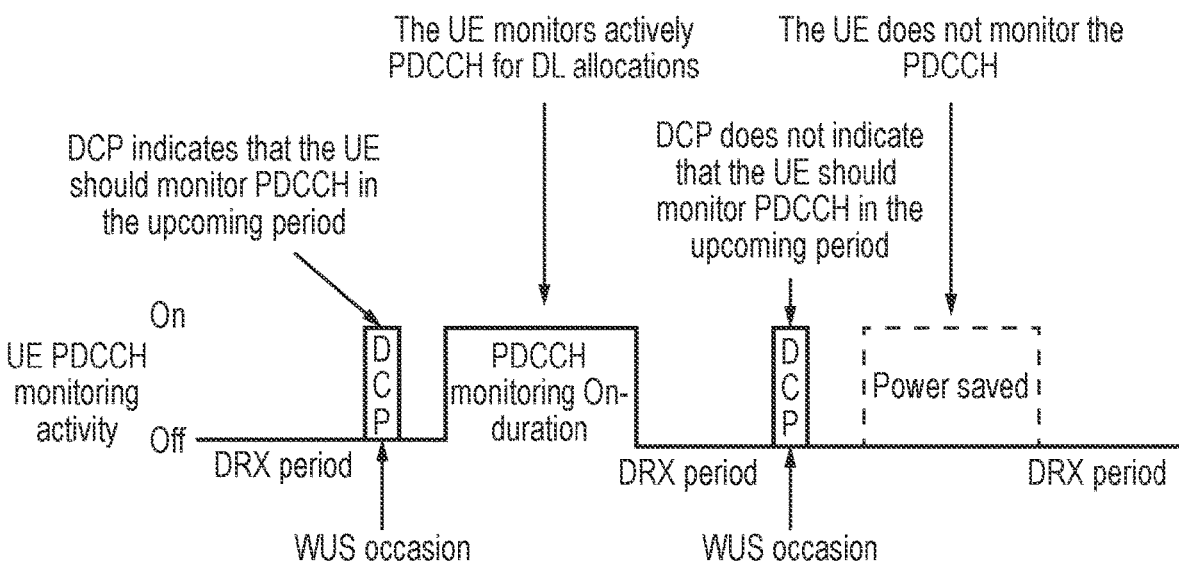

The UE monitors actively PDCCH for DL allocations

The UE does not monitor the PDCCH

DCP indicates that the UE should monitor PDCCH in the upcoming period

DCP does not indicate that the UE should monitor PDCCH in the upcoming period

On

UE PDCCH monitoring activity Off

DCP

PDCCH monitoring On-duration

DCP

Power saved

DRX period

DRX period

DRX period

WUS occasion

WUS occasion

WUS wakeup receiver

Passive wakeup circuit

NR modem (transceiver)

ACTIVATION OF A WIRELESS TRANSCEIVER USING WAKEUP SIGNALS

TECHNOLOGICAL FIELD

Various example embodiments relate to the use of wakeup signals and a wakeup signal detector to activate a wireless transceiver from an idle or inactive state.

BACKGROUND

The energy efficiency of devices within networks, particularly small devices without a continuous energy source, such as UEs using small rechargeable and single coin cell batteries is increasingly important. A wireless transceiver configured to receive and transmit signals consumes a significant amount of power, and thus, to reduce power consumption discontinuous operation using inactive and idle states for the transceiver may be used. A disadvantage with such a system is that the receipt of relevant signals may be missed and latency increased.

It would be desirable to be able to reduce power consumption without unduly increasing latency.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided an apparatus, comprising: means for transmitting and receiving wireless communication signals, said means for transmitting and receiving wireless communication signals comprising an active state and at least one of an idle and inactive state; a plurality of means for detecting a plurality of forms of wakeup signals and for triggering activation of said means for transmitting and receiving wireless communication signals in response to detection of a wakeup signal intended for said apparatus; and means for controlling said plurality of means for detecting; wherein said means for controlling is configured in response to said apparatus receiving a signal indicating timings during which different forms of said wakeup signals are to be transmitted to control a respective one of said plurality of means for detecting to process said received wakeup signals in dependence upon a current time and said received signal indicating said timings.

Reducing the power consumption of apparatus used for wireless communication such as user equipment may allow such devices to have a single use power source and/or a reduced sized power source thereby improving their lifetime and reliability and reducing the need to periodically access the devices. The means for transmitting and receiving signals within an apparatus consumes a significant amount of power and thus, configuring this with idle and/or inactive states can significantly reduce the power consumption of the apparatus. However, while in an inactive or idle state the apparatus' ability to receive signals is compromised and thus, latency involved in communication with the apparatus may be significantly affected. This has been addressed by the use of a separate means for detecting wake up signals allowing the means for transmitting and receiving to be activated when it is required. The means for detecting wake up signals may be configured to consume significantly less power than the means for transmitting and receiving wireless communication signals and thus, a significant energy reduction can be provided.

However, although requiring significantly less power than the means for transmitting and receiving wireless communication signals the means for detecting wake up signals may itself consume power and for devices with small energy sources this may be significant. With this in mind, example embodiments seek to provide a plurality of different means for detecting different forms of wake up signals the different forms having different characteristics and their detection having correspondingly different reliability issues. The means for detecting the different types of signals have different energy consumptions associated with them and by providing the different forms of wakeup signals at different times and also providing an indication of these timings, the apparatus may be controlled to use the different forms of wakeup signal detecting means at the appropriate times thereby enabling an apparatus that has the advantage of extremely low power for some periods of time and the advantage of increased reliability in detecting signals at others. This provides a compromise in power consumption and latency and helps inhibit the latency becoming too large while maintaining a low energy consumption over the detection period.

In some example embodiments, said plurality of means for detecting may be a plurality of separate units or a plurality of branches or arms of a single unit.

In some example embodiments, said signal indicating the said timings comprises a signal indicating a pattern of timings for the transmission or broadcast of said different forms of said wake up signal.

In some embodiments said signal indicating said timing comprises a signal indicating a pattern of timings and frequency resources for the transmission or broadcast of said different forms of said wakeup signal.

In some example embodiments, said pattern comprises a repeating pattern.

In some example embodiments, said plurality of forms of said wakeup signal comprises an encoded form and a raw form and said plurality of means for detecting comprise: an active means for detecting said encoded form of said wakeup signal; and a passive means for detecting a pattern of said raw form of said wakeup signal.

In some example embodiments, said plurality of forms of said wakeup signal further comprises a hybrid form and said plurality of means for detecting further comprises: a hybrid means for detecting said hybrid form of said wakeup signal.

In some example embodiments the hybrid form of wakeup signal comprises a signal that may be interpreted by both a passive and an active wakeup detector.

In some example embodiments, said means for controlling is configured to control said active means for detecting to be active in response to said signal indicating said timings indicating said encoded form of said wakeup signal is currently being transmitted and to be inactive where said signal indicating said timings indicates said raw form of said wakeup signal is being transmitted.

In some example embodiments, said active means for detecting comprises a means for decoding said encoded form of said wakeup signal and for determining from said decoded wakeup signal if said wakeup signal is intended for said apparatus and where so to trigger activation of said means for transmitting and receiving.

In some example embodiments, triggering activation of said means for transmitting and receiving comprising triggering transition of said means for transmitting and receiving from an inactive or idle state to an active state.

In some example embodiments, said means for transmitting and receiving has a long discontinuous reception DRX cycle during much of which said means for transmitting and receiving is in an inactive or idle state.

In some example embodiments triggering activation may be done by sending a binary signal indicative of on or off to said means for transmitting and receiving.

In some example embodiments, said means for controlling is configured in response to said signal indicating said timings indicating said raw form of said wakeup signal is to currently being transmitted to control said passive means for detecting to process said wakeup signals.

In some example embodiments, said passive means comprises a means for harvesting energy from a received signal and means for detecting a pattern of said wakeup signal, said pattern being indicative of an apparatus for which said wakeup signal is intended, said passive means for detecting being configured to trigger activation of said means for transmitting and receiving in response to determining that said wakeup signal is intended for said apparatus.

In some example embodiments, said hybrid means for detecting comprises a storing means for storing signals, said means for controlling being configured to control said storing means to store signals in response to said signal indicating said timings indicating that said hybrid form of said wakeup signal is currently being transmitted.

In some example embodiments, said means for controlling is configured in response to said signal indicating said timings indicating that said hybrid form of said wakeup signal is currently being transmitted to control said passive means for detecting to process said wakeup signals for a predetermined time and in response to no wakeup signal being detected to control said active means to process said wakeup signals stored in said storing means.

In some example embodiments, said apparatus further comprises a timer, said means for controlling being configured in response to determining that said means for transmitting and receiving has entered one of said idle or inactive states to set said timer, and after a predetermined time if said means for transmitting and receiving signals has not transitioned from said inactive or idle state to said active state to activate said means for transmitting and receiving.

In some example embodiments, the means comprise: at least one processor; and at least one memory storing instructions, that when executed by the at least one processor, cause the performance of the apparatus.

According to various, but not necessarily all, embodiments of the invention there is provided according to an aspect a method, comprising: receiving a signal indicating timings during which different forms of a wakeup signals are to be transmitted; controlling a respective one of said plurality of means for detecting to process said m received wakeup signals in dependence upon a current time and said received signal indicating said timings; and triggering activation of a means for transmitting and receiving wireless communication signals in response to detection of a wakeup signal intended for said apparatus by said one of said plurality of means for detecting.

In some example embodiments, said plurality of means for detecting comprises an active means for detecting and a passive means for detecting and said step of controlling comprises: controlling said active means for detecting to be active in response to said signal indicating said timings indicating an encoded form of said wakeup signal is currently being transmitted and to be inactive where said signal indicating said timings indicates a raw form of said wakeup signal is being transmitted.

In some example embodiments, said step of controlling comprises: controlling said passive means for detecting to process said wakeup signal in response to said signal indicating said timings indicating a raw form of said wakeup signal is currently being transmitted.

In some example embodiments, said method further comprises: in response to said active means for detecting determining from decoding said encoded wakeup signal that said wakeup signal is intended for said apparatus triggering activation of said means for transmitting and receiving.

In some example embodiments, said method further comprises: in response to said passive means for detecting determining from said raw wakeup signal that said wakeup signal is intended for said apparatus triggering activation of said means for transmitting and receiving.

In some example embodiments, said plurality of forms of said wakeup signal further comprises a hybrid form and said plurality of means further comprises: a hybrid means for detecting said hybrid form of said wakeup signal, said hybrid means comprising a storing means; and said step of controlling comprises controlling said storing means to store signals in response to said signal indicating said timings indicating that said hybrid form of said wakeup signal is currently being transmitted.

In some example embodiments, said step of controlling comprises in response to said to signal indicating said timings indicating that said hybrid form of said wakeup signal is currently being transmitted controlling said passive means for detecting to process said wakeup signals for a predetermined time and in response to no wakeup signal being detected controlling said active means to process said wakeup signals stored in said storing means.

In some example embodiments, said apparatus further comprises a timer, said step of controlling being responsive to said means for transmitting and receiving entering an inactive or idle state to initiate said timer, and after a predetermined time if said means for transmitting and receiving signals has not transitioned from said inactive or idle state to said active state to activate said means for transmitting and receiving signals.

According to various, but not necessarily all, embodiments of the invention there is provided a computer program which when executed by a processor on an apparatus is operable to control said apparatus to perform a method according to an aspect.

According to various, but not necessarily all, embodiments of the invention there is provided an apparatus, comprising: circuitry configured to transmit and receive wireless communication signals, said circuitry configured to transmit and receive comprising an active state and at least one of an idle and inactive state; a plurality of circuitry configured to detect a plurality of forms of wakeup signals and for triggering activation of said circuitry configured to transmit and receive in response to detection of a wakeup signal intended for said apparatus; a control circuitry configured in response to said apparatus receiving a signal indicating timings during which different forms of said wakeup signals are to be transmitted to control a respective one of said plurality of detecting circuitry to process said received wakeup signals in dependence upon a current time and said received signal indicating said timings.

In some example embodiments, said plurality of circuitry configured to detect comprises: active circuitry for detecting an encoded form of said wakeup signal; and passive circuitry configured to detect a pattern of a raw form of said wakeup signal.

In some example embodiments, said plurality of forms of said wakeup signal further comprises a hybrid form and said plurality of circuitry configured to detect further comprises: hybrid circuitry configured to detecting a hybrid form of said wakeup signal.

In some example, embodiments, said active circuitry configured to detect comprises decoding circuitry configured to decode said encoded form of said wakeup signal and to determine from said decoded wakeup signal if said wakeup signal is intended for said apparatus and where so to trigger activation of said circuitry configured to transmit and receive.

In some example embodiments, said passive circuitry configured to detect comprises circuitry configured to harvest energy from a received signal and detecting circuitry configured to detect a pattern of said wakeup signal, said pattern being indicative of an apparatus for which said wakeup signal is intended, said passive circuitry being configured to trigger activation of said circuitry configured to transmit and receive in response to determining that said wakeup signal is intended for said apparatus.

In some example embodiments, said hybrid circuitry configured to detect comprises storing circuitry configured to store signals.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 1 illustrates an example concept for waking up a New Radio receiver;

FIG. 2 illustrates a portion of a user equipment according to an example embodiment

DETAILED DESCRIPTION

Figure 3:
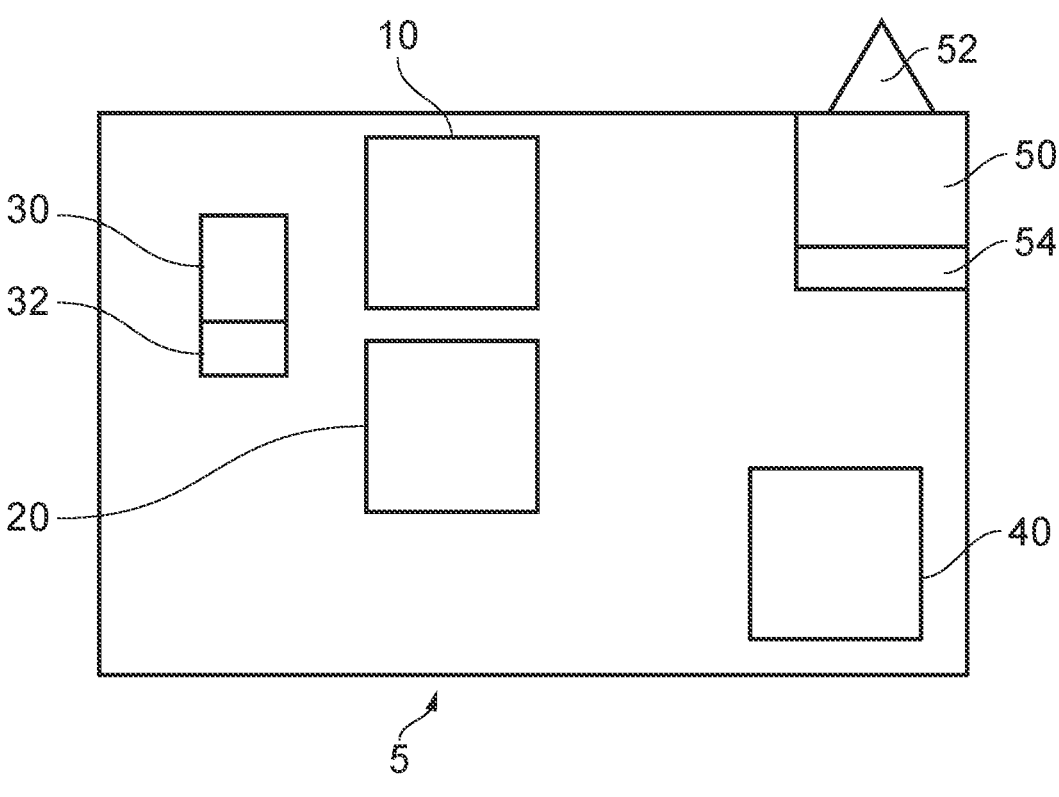
FIG. 3 illustrates a user equipment according to an example embodiment.

Before discussing the example embodiments in any more detail, first an overview will be provided.

5G systems are designed and developed for both mobile telephony and vertical use cases. Besides latency, reliability, and availability, UE (user equipment) energy efficiency is also critical to 5G. Currently, 5G devices may have to be recharged per week or day, depending on individual's usage time. In general, 5G devices consume tens of milliwatts in RRC idle/inactive state and hundreds of milliwatts in RRC connected state. Designs to prolong battery life is a necessity for improving energy efficiency as well as for better user experience.

Energy efficiency is even more critical for UEs without a continuous energy source, e.g., UEs using small rechargeable and single coin cell batteries. Among vertical use cases, sensors and actuators are deployed extensively for monitoring, measuring, charging, etc. Generally, their batteries are not rechargeable and expected to last at least few years. Wearables include smart watches, rings, eHealth related devices, and medical monitoring devices. With typical battery capacity, it is challenging to sustain up to 1-2 weeks as required.

The power consumption depends on the configured length of wake-up periods, e.g., paging cycle. To meet the battery life requirements above, eDRX (extended discontinuous reception) cycle with a large value might be a solution, however this would result in high latency, which is not suitable for services with requirements of both long battery life and low latency.

Currently, UEs need to periodically wake up once per DRX cycle, which dominates the power consumption in periods with no signalling or data traffic. If UEs are able to wake up only when they are triggered, e.g., paging, power consumption could be dramatically reduced.

For NR (new radio) power saving, a dedicated wakeup signal may be defined to instruct the UE to wakeup at the next DRX on-duration. This signal may be defined as downlink control information (DCI) with cyclic redundancy check (CRC) scrambled by paging system radio network temporary identifier (PS-RNTI), it may also be known as "DCP". If a UE does not receive the DCP during the network-defined wakeup occasion(s), or a received DCP does not contain a wakeup indication, the UE may assume there is no data, and can skip monitoring the physical downlink control channel (PDCCH) during the next DRX-on duration. Thus, saving power may be achieved when no data is present. Further, to reduce false alarms (leading to waking up a UE unnecessarily), the DCP wakeup signal (WUS) may be targeted to a UE specific identifier such as, for example, the PS-RNTI.

FIG. 1 illustrates an example DCP concept for waking up a NR receiver. To monitor a WUS occasion, the UE may use an energy-based wakeup receiver (WRx). In some cases, even when the WRx has reduced capability, it may still be an active unit (i.e., it may need a power source such as a battery to run (unlike a passive unit that does not have a power source)). Upon detection of the UE-specific WUS signal by the WRx, the latter may trigger the full NR baseband (BB) receiver (BBRx) or modem to wakeup to monitor the next PDCCH occasion. Further, since the WRx may need to be active for all WUS occasions, the power saving that can be achieved with the WUS framework may be upper bounded by the costs of running the WRx. Thus, for a power limited UE, there may be a concern for how the energy costs of running the WRx can be reduced.

Embodiments seek to use a wake-up signal to trigger activation of the main radio transceiver and to use a separate receiver for monitoring wake-up signals, the separate receiver being configured to operate with low or ultra-low power consumption. The main radio transceiver may be turned off or set to deep sleep for power saving and turned on when required.

The power consumption for monitoring wake-up signal depends on the wake-up signal design and the hardware module of the wake-up receiver used for signal detecting and processing.

To address the competing objectives of reducing power while not unduly extending latency, a system configured to use different forms of WUS (wakeup signals) and corresponding forms of receivers has been provided such that the WUS (wake up signal) occasion may be monitored for using one of an active wakeup receiver, a passive wakeup receiver or in some cases a hybrid wakeup receiver. In some embodiments there may be a single wakeup receiver with different branches configured for passive, active or hybrid operation.

An active wakeup receiver is configured to receive and decode an encoded wakeup signal that is one with a payload containing an indication of the apparatus Identity such that decoding of the signal indicates to the apparatus whether the wakeup signal is addressed to it or not. A passive wakeup receiver is configured to receive and detect a raw wakeup signal that is one that has no payload but is rather a sequence of bits generated to provide a certain pattern, the pattern being indicative of the apparatus to which it is addressed. The passive wakeup receiver is configured to recognise the pattern. The passive wakeup receiver may be powered by energy harvesting from received signals used to charge a capacitor for example.

In summary, example embodiments propose an augmented WRx (wakeup receiver) architecture in which the WRx is implemented as a hybrid structure containing a passive branch and an active branch, the latter in some embodiments implementing the standard NR (new radio) wakeup detector. The augmented WRx may also comprise a data store for storing received signals such that where a signal is received and the passive branch is unable to detect that the pattern then the stored signal may be analysed by the active decode.

In summary, the UE architecture may comprise at least two wakeup entities together with the traditional 5G NR modem/transceiver:

A WUS passive receiver (WPR) associated with an external trigger signal to power & activate the entity.

A WUS active receiver (WAR) associated with a periodic "paging" signal (the WAS signal from FIG. 1).

A 5G NR modem (5NM) with the possibility to disable the normal paging cycle. During the activation process, either WPR, WAR, or 5NM is configured as the primary wakeup entity.

FIG. 2 schematically shows parts of a user equipment according to an example embodiment. The user equipment comprises two wakeup receivers an active wakeup receiver 10 that is powered and configured to detect an encoded wakeup signal and a passive wakeup circuit 20 that consumes no power rather harvesting energy from a received signal and detects a raw wakeup signal the pattern of which indicates the user equipment to which it is addressed. Each of the receivers are operable at different times, and if either detects a wakeup signal addressed to the user equipment then an activation signal is sent to the modem 50 to transition it to active mode.

FIG. 3 shows in more detail an apparatus 5 according to an example embodiment. The apparatus 5 may be a user equipment configured to communicate wirelessly via a wireless network with other user equipment or with a network node. The user equipment 5 comprises an antenna 52 for transmitting and receiving wireless signals and a transceiver 50 which maybe in the form of a new radio modem. The transceiver 50 is configured to operate in an extended discontinuous mode such that periodically it is in an idle or inactive mode and is not monitoring for received signals. User equipment 5 comprises a wakeup receiver for detecting wake up signals and in this embodiment, this is in the form of three entities, an active wake up receiver 10, a passive wakeup receiver 20 and a hybrid wakeup receiver 30.

Active wakeup receiver 10 is configured to receive active signals with a payload. Active wake up receiver is powered when it is processing signals and decodes received signals to determine whether a user equipment identifier associated with the signal identifies the current user equipment 5. If it does then active wake up receiver 10 triggers transceiver 50 to transition to an active state ready to receive wireless communication signals. In addition to active wakeup receiver 10 there is also a passive wake up receiver 20 configured to detect signals which comprise a sequence in a particular pattern, the pattern being indicative of the apparatus 5. Passive wake up receiver 20 is not powered but rather harvests energy from received signals from surrounding devices and uses this to charge its energy source which may be a capacitor. There is also a hybrid wakeup receiver 30 comprising data store 32 that is associated with the wakeup receivers which is used during the hybrid mode of operation. During hybrid mode of operation the hybrid wakeup receiver stores the received signal in data store 32 and passive wakeup receiver monitors for a wakeup signal. If none is detected in a predetermined time, then the active wakeup receiver 10 is activated to monitor the stored signal to see if one has been received.

User equipment 5 also comprises control circuitry 40 for controlling the wakeup receivers. In operation, the transceiver 50 receives a control signal indicating a wakeup signal pattern indicative of timings of transmission of wakeup signals from the network and provides this to the control circuitry 40. The control circuitry 40 uses this in association with an indication of the current time to control the different wakeup receivers to process the received signal. The wakeup signal pattern may indicate a period during which a passive wakeup signal may be transmitted and a period during which an active wakeup signal may be transmitted and a hybrid period where both active and passive signals may be transmitted. During the indicated active period the control circuitry controls the active wakeup receiver 10 to be active and to monitor for active wakeup signals. During the passive period the control circuitry 40 controls the passive wakeup receiver 20 to detect for received wakeup signals and the active wakeup receiver to enter an inactive state. The passive wakeup receiver will monitor for the patterns in signals received using energy harvested from received signals to power itself. The passive wakeup receiver 20 does not require an energy source but is less reliable than the active wakeup signal receiver and thus, using the two in combination has advantages. Where the passive wakeup receiver detects a pattern indicative of the user equipment 5 it will trigger activation of the modem 50.

In some cases there may be a hybrid mode of operation and during the hybrid mode of operation the control circuitry will control the data store 32 to store the received signal received while the passive wakeup receiver monitors the signal. If no wakeup signal is detected then the control circuitry 40 will control the active wakeup receiver 10 to monitor the stored signal. The active wakeup receiver 10 may monitor for the pattern and/or it may also monitor for an active signal that may be transmitted during that time period and will be stored in data store 30.

The transceiver 50 additionally has a timer 54 which it triggers on entering idle mode. If the timer reaches a predetermined time before a wakeup signal from one of the wakeup receivers has been received then it will activate itself and communicate with a network node.

Figure 4:
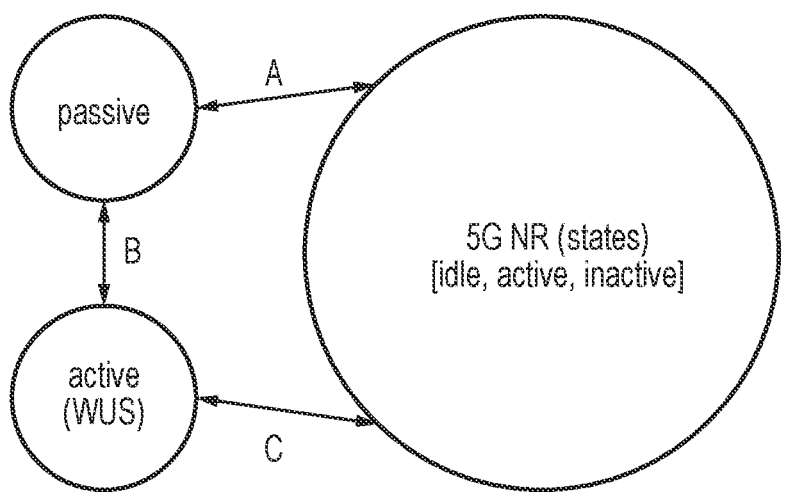
FIG. 4 illustrates the switching of states of wakeup receivers and a modem according to an example embodiment.

FIG. 4 illustrates the states in the hybrid passive/active wakeup architectures according to an example embodiment.

In an example embodiment the following steps may be performed:

The UE informs the NW about the wakeup capabilities for passive vs active detection that it supports. The passive detection level (e.g. signal decoding or signal demodulation) may also be indicated.

The Serving network node which may be a gNB transmits a signal indicating a wakeup signal pattern providing timings and in some cases frequency resources in which different configurations of wakeup signals may be transmitted, in this regard different configurations may be transmitted in different frequency bands:

The user equipment is configured with extreme long DRX cycle, e.g. hours or days as a backup access to the device in case no passive activators are in the proximity.

During the hybrid time frame the passive wakeup detector will be active and any signal received will be stored, where no wakeup signal is detected during a certain time frame, the active wakeup detector will monitor the stored data to determine whether it can detect a wakeup signal, the device will transition between states "B"

The device will be configured with a timer such that where no wakeup signal is received the 5G NR modem will send a PRACH request upon the time-out. This option will transition between states "A"

During the time frame when active wakeup signals are sent

The device is configured with active wakeup and configured in "active" state.

Upon detecting the time pattern reaching the period during which passive wakeup signals are transmitted, the device will transition to "passive" state. Again when detecting the time period reaching the period when active wakeup signals are transmitted the device will transition to the active state. This option will transition between states "B"

Again the device is configured with a time where the 5G NR modem will send a PRACH request upon the time-out. This option will transition between states "C"

Figures 5, 6:
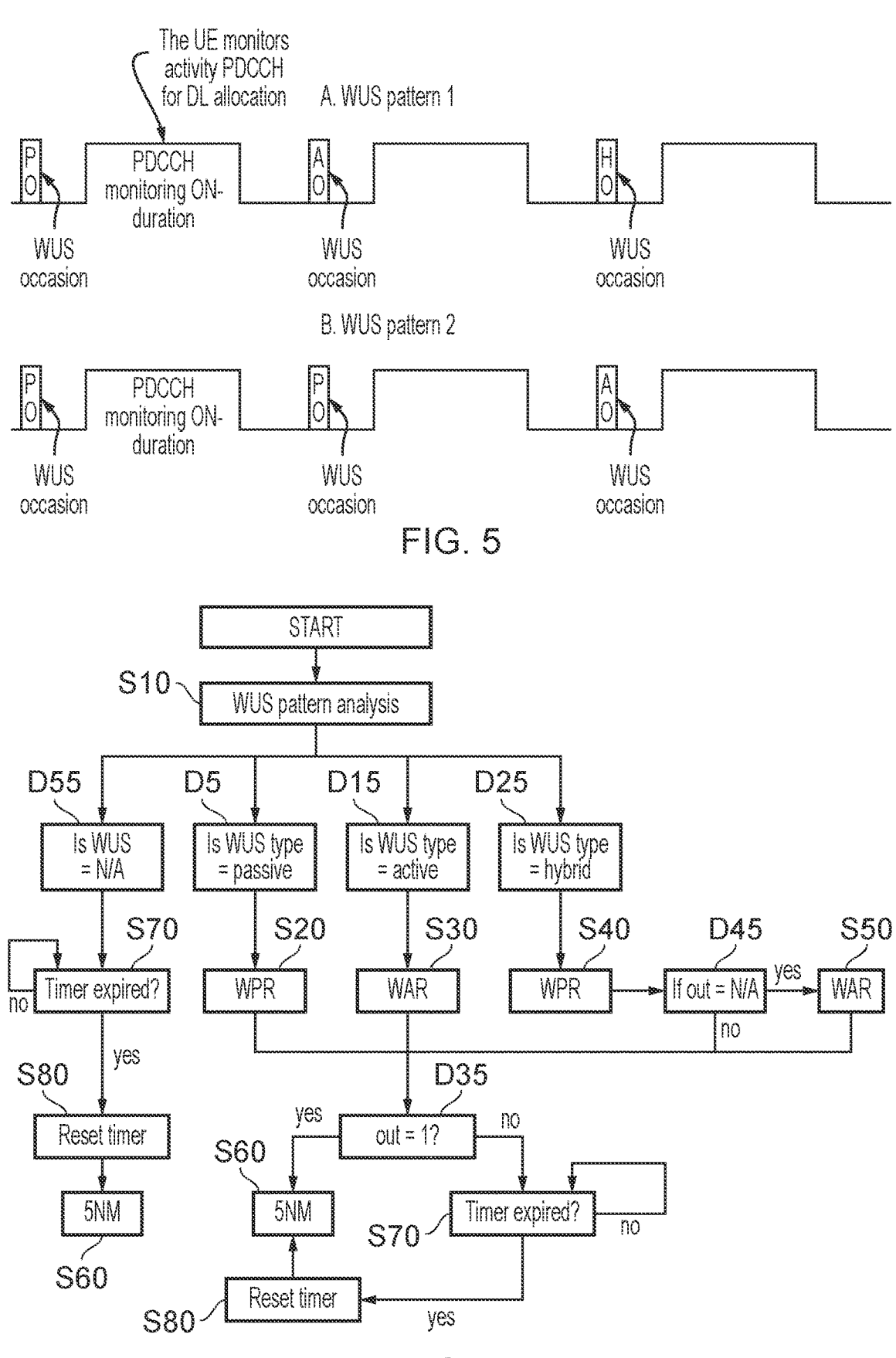
FIG. 5 illustrates example wakeup signal patterns, according to certain example embodiments.
FIG. 6 illustrates a flow diagram illustrating steps in a method according to an embodiment.

FIG. 5 shows two example waveform pattern that the wakeup signals may be transmitted as. As illustrated in FIG. 5, once the NW has detected a change and/or a cause of the change in a condition associated with a UE, the NW may generate an updated WUS pattern. As illustrated in FIG. 5, there may be one or more WUS (wakeup signal) occasion that may be used to define a WUS pattern. For instance, there may be a PO (passive occasion) WUS, which may be associated with sending a WUS signal targeted at the passive receiver. Such a PO WUS signal may be selected in relation to the passive receiver capability. In this case, the PO WUS may be a raw reference signal such as, for example, a Zadoff-Chu or Gold sequence.

Another WUS pattern may include an AO (active occasion) WUS, which may be associated with sending a WUS signal targeted at the active receiver branch. In this situation, the AO WUS may implement the standard NR DCP signal, and the active branch may implement the detection of PS-RNTI.

In other example embodiments, the WUS pattern may also include a HO (hybrid occasion) WUS associated with sending a WUS signal targeted first at the passive receiver branch, and only upon detection failure by the passive receiver, targeted at the active receiver branch. In this case, the HO WUS may include a first set of resources used for a PO WUS, and a second set of resources used for transmitted an AO WUS. In this context, a resource may refer to a set of resource elements (REs), physical resource blocks (PRBs), a carrier, a BWP (bandwidth part), etc. For example, according to certain example embodiments, a HO WUS may be generated by assigning N REs for transmitting a PO WUS, and assigning the remaining REs for an AO WUS, where N may represent a number of indices of RE in a given BW (bandwidth).

According to certain example embodiments, once the HO WUS has been generated, the wakeup signal receiver may trigger a memory buffer to store RE N+1:M. Additionally, the wakeup signal receiver may trigger the passive branch to detect RE 1:N. Where N is the length of the PO WUS and M-N is the length of the AO WUS. If the detection fails (e.g., the passive branch does not generate an intelligible backscatter signal (e.g., 1 or 0)), then the active branch may be activated and the buffered samples may be used as input for the subsequent detection.

The augmented wakeup signal receiver architecture proposed in FIGS. 2 and 3 comprises two receivers or branches that comprise:

The wakeup passive-receiver (WPR) 20 implemented by means of passive radios which do not require a power source to operate. WPR harvests energy from an incoming signal, and using the harvested energy, powers up a simple receiver that modulates the received waveform according to a pattern representative of the WPR identity. For example, if the wakeup signal WUS was intended for the UE hosting WPR, then WPR powers on and generates a binary signal that activates the NR modem (5NM), for the subsequent data detection.

The wakeup active receiver (WAR) 10 is implemented as an active NR detector. The detector may consist of standard functionalities of:

demodulating and decoding the signal.

Detecting patterns in the signal envelope, etc.

Similarly, WAR generates a binary signal (if the detection is successful) which activates the 5NM.

The 5NM 30 which is activated by the output of WPR or WAR, or after a timer 52 has expired, where the timer is associated with a maximum allowed period of unresponsiveness from WPR or WAR.

WPR, WAR and 5NM may be activated stand-alone or in combination, depending on the WUS pattern configured by the gNB as shown in FIG. 5.

FIG. 6 illustrates a flow chart showing steps in a method according to an embodiment. Initially at step S10, the wakeup signal receiver boots up by analyzing the WUS pattern configured by the gNB. If the current WUS occasion is a passive occasion D5, then WPR is triggered S20 and where a pattern indicating the UE is detected D35 its output activates 5NM S60.

Conversely, if the WUS occasion is an active occasion D15, WAR is used S30 for WUS decoding. When WUS occasion is hybrid D35, the WPR monitors the signal S40 and the signal is buffered, and if the WPR detection fails D45 e.g. the output signal is not intelligible (due to failing to charge the WPR), the buffered samples are used in WAR S50.

Where the WAR or WPR detects a wakeup signal addressed to the UE D35 then the modem 5NM is activated S60. If not wake up signal is detected in a time period then when the timer timing the time period has expired S70 the timer is reset at step S80 and the modem 5NM is activated at step S60. This ensures that the modem is activated periodically where no wakeup signals are received. Similarly, if there is no indication of the type of wakeup signal derivable from the WUS pattern analyses D55 then the 5NM will be activated when the timer has expired S70 and the timer will be reset S80.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:

transceiver circuitry to transmit and receive wireless communication signals, said transceiver circuitry to transmit and receive comprising: an active state; and at least one of an idle and inactive state;

a plurality of detecting circuitries configured to detect a plurality of forms of wakeup signals and for triggering activation of said transceiver circuitry to transmit and receive in response to detection of a wakeup signal intended for said apparatus; and control circuitry configured to, in response to said apparatus receiving a signal indicating timings during which different forms of said wakeup signals are to be transmitted, control a respective one of said plurality of detecting circuitries to process said received wakeup signals in dependence upon a current time and said received signal indicating said timings, wherein said plurality of forms of said wakeup signals comprise an encoded form and a raw form, and said plurality of detecting circuitries comprises:

an active circuitry configured to detect said encoded form of said wakeup signal; and a passive circuitry configured to detect a pattern of said raw form of said wakeup signal, and wherein said plurality of forms of said wakeup signals further comprises a hybrid form and said plurality of detecting circuitries configured to detect further comprises:

hybrid circuitry configured to detect said hybrid form of said wakeup signal.

2. An apparatus comprising:

transceiver circuitry configured to transmit and receive wireless communication signals, said transceiver circuitry configured to transmit and receive comprising: an active state; and at least one of an idle and inactive state;

a plurality of detecting circuitry circuitries configured to detect a plurality of forms of wakeup signals and for triggering activation of said transceiver circuitry configured to transmit and receive in response to detection of a wakeup signal intended for said apparatus; and control circuitry configured to, in response to said apparatus receiving a signal indicating timings during which different forms of said wakeup signals are to be transmitted, control a respective one of said plurality of detecting circuitries to process said received wakeup signals in dependence upon a current time and said received signal indicating said timings, wherein said plurality of forms of said wakeup signals comprise an encoded form and a raw form, and said plurality of detecting circuitries comprises:

an active circuitry configured to detect said encoded form of said wakeup signal; and a passive circuitry configured to detect a pattern of said raw form of said wakeup signal, and wherein said control circuitry is configured to control said active circuitry configured to detect to be active in response to said signal indicating said timings indicating said encoded form of said wakeup signal is currently being transmitted and to be inactive where said signal indicating said timings indicates said raw form of said wakeup signal is being transmitted.

3. The apparatus according to claim 1, wherein said hybrid circuitry configured to detect comprises storing circuitry for storing signals, said control circuitry being configured to control said storing circuitry to store the signals in response to said signal indicating said timings indicating that said hybrid form of said wakeup signal is currently being transmitted.

4. The apparatus according to claim 3, wherein said control circuitry is configured, in response to said signal indicating said timings indicating that said hybrid form of said wakeup signal is currently being transmitted, to control said passive circuitry for detecting to process said wakeup signals for a predetermined time and, in response to no wakeup signal being detected, to control said active circuitry to process said wakeup signals stored in said storing circuitry.

5. An apparatus comprising:
transceiver circuitry to transmit and receive wireless communication signals, said transceiver circuitry to transmit and receive comprising: an active state; and at least one of an idle and inactive state;
a plurality of detecting circuitries configured to detect a plurality of forms of wakeup signals and for triggering activation of said transceiver circuitry to transmit and receive in response to detection of a wakeup signal intended for said apparatus;
control circuitry configured to, in response to said apparatus receiving a signal indicating timings during which different forms of said wakeup signals are to be transmitted, control a respective one of said plurality of detecting circuitries to process said received wakeup signals in dependence upon a current time and said received signal indicating said timings; and,
a timer, wherein said control circuitry is configured to, in response to determining that said transceiver circuitry to transmit and receive has entered one of said idle or inactive states, set said timer, and after a predetermined time, if said transceiver circuitry to transmit and receive signals has not transitioned from said inactive or idle state to said active state, to activate said transceiver circuitry configured to transmit and receive.

6. The apparatus according to claim 1, wherein the transceiver circuitry, the control circuitry and the plurality of detecting circuitries comprise: at least one processor; and at least one memory storing instructions that, when executed by the at least one processor, cause the performance of the apparatus.

7. The apparatus according to claim 1, wherein said active circuitry configured to detect comprises decoding circuitry configured to: decode said encoded form of said wakeup signal; and determine from said decoded wakeup signal if said wakeup signal is intended for said apparatus and where so to trigger activation of said transceiver circuitry to transmit and receive.

8. The apparatus according to claim 1, wherein said control circuitry is configured to, in response to said signal indicating said timings indicating said raw form of said wakeup signal is currently being transmitted, control said passive circuitry configured to detect to process said wakeup signals.

9. The apparatus according to claim 1, wherein said passive circuitry comprises harvest circuitry to harvest energy from a received signal and detecting circuitry to detect a pattern of said wakeup signal, said pattern being indicative of said apparatus for which said wakeup signal is intended, said passive circuitry being configured to trigger activation of said transceiver circuitry to transmit and receive in response to determining that said wakeup signal is intended for said apparatus.

10. The apparatus according to claim 2, wherein said active circuitry configured to detect comprises decoding circuitry configured to decode said encoded form of said wakeup signal and to determine from said decoded wakeup signal if said wakeup signal is intended for said apparatus and where so to trigger activation of said transceiver circuitry to transmit and receive.

11. The apparatus according to claim 2, wherein said control circuitry is configured to, in response to said signal indicating said timings indicating said raw form of said wakeup signal is currently being transmitted, control said passive circuitry configured to detect to process said wakeup signals.

12. The apparatus according to claim 2, wherein said passive circuitry comprises harvest circuitry to harvest energy from a received signal and detecting circuitry to detect a pattern of said wakeup signal, said pattern being indicative of the apparatus for which said wakeup signal is intended, said passive circuitry being configured to trigger activation of said transceiver circuitry to transmit and receive in response to determining that said wakeup signal is intended for said apparatus.

13. The apparatus according to claim 2, wherein the transceiver circuitry, the control circuitry and the plurality of circuitries comprise: at least one processor; and at least one memory storing instructions that, when executed by the at least one processor, cause the performance of the apparatus.

14. The apparatus according to claim 5, wherein the transceiver circuitry, the control circuitry and the plurality of circuitries comprise: at least one processor; and at least one memory storing instructions that, when executed by the at least one processor, cause the performance of the apparatus.

15. The apparatus according to claim 5, wherein said plurality of forms of said wakeup signals comprise an encoded form and a raw form, and said plurality of detecting circuitries comprises:
an active circuitry configured to detect said encoded form of said wakeup signal; and
a passive circuitry configured to detect a pattern of said raw form of said wakeup signal.

16. The apparatus according to claim 15, wherein said active circuitry configured to detect comprises decoding circuitry configured to: decode said encoded form of said wakeup signal and determine from said decoded wakeup signal if said wakeup signal is intended for said apparatus and where so to trigger activation of said transceiver circuitry to transmit and receive.

17. The apparatus according to claim 15, wherein said control circuitry is configured to, in response to said signal indicating said timings indicating said raw form of said wakeup signal is currently being transmitted, control said passive circuitry configured to detect to process said wakeup signals.

18. The apparatus according to claim 15, wherein said passive circuitry comprises harvest circuitry to harvest energy from a received signal and detecting circuitry to detect a pattern of said wakeup signal, said pattern being indicative of said apparatus for which said wakeup signal is intended, said passive circuitry being configured to trigger activation of said transceiver circuitry to transmit and receive in response to determining that said wakeup signal is intended for said apparatus.

* * * * *